(12) United States Patent
Surnilla et al.

(10) Patent No.: US 9,051,890 B2
(45) Date of Patent: Jun. 9, 2015

(54) METHOD FOR ESTIMATING CHARGE AIR COOLER CONDENSATION STORAGE WITH AN INTAKE OXYGEN SENSOR

(71) Applicant: Ford Global Technologies, LLC, Dearborn, MI (US)

(72) Inventors: Gopichandra Surnilla, West Bloomfield, MI (US); Daniel Joseph Styles, Canton, MI (US); James Alfred Hilditch, Canton, MI (US); Mehdi Abarham, Berkeley, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 64 days.

(21) Appl. No.: 14/065,147

(22) Filed: Oct. 28, 2013

(65) Prior Publication Data

US 2015/0113979 A1    Apr. 30, 2015

(51) Int. Cl.
*F02B 33/44* (2006.01)
*F02B 33/00* (2006.01)
*F02B 29/04* (2006.01)
*F02D 43/04* (2006.01)

(52) U.S. Cl.
CPC ............ *F02D 43/04* (2013.01); *F02B 29/0468* (2013.01); *F02B 29/04* (2013.01); *Y02T 10/144* (2013.01)

(58) Field of Classification Search
CPC .... F02B 29/04; F02B 29/0468; Y02T 10/144
USPC ................. 60/605.1, 605.2; 123/563
See application file for complete search history.

(56) References Cited

U.S. PATENT DOCUMENTS

| 6,725,848 | B2 | 4/2004 | Ramamurthy et al. |
| 6,948,475 | B1 | 9/2005 | Wong et al. |
| 8,296,042 | B2 | 10/2012 | Xiao et al. |
| 2013/0144470 | A1 | 6/2013 | Ricci |
| 2013/0275030 | A1 | 10/2013 | Kim et al. |
| 2014/0048050 | A1* | 2/2014 | Pfab .......................... 123/568.12 |

FOREIGN PATENT DOCUMENTS

| DE | 102012200062 A1 * | 7/2013 | .............. F02B 29/04 |
| WO | WO 2012146357 A1 * | 11/2012 | .............. F02B 29/04 |

OTHER PUBLICATIONS

MacNeille, Perry Robinson et al., "System and Method for Estimating Ambient Humidity," U.S. Appl. No. 14/286,631, filed May 23, 2014, 50 pages.
Styles, Daniel J. et al., Charge Air Cooler (CAC) Corrosion Reduction Utilizing Grille Shutters, U.S. Appl. No. 13/656,524, filed Oct. 19, 2012, 33 pages.

(Continued)

*Primary Examiner* — Audrey K Bradley
(74) *Attorney, Agent, or Firm* — Julia Voutyras; Alleman Hall McCoy Russell & Tuttle LLP

(57) ABSTRACT

Methods and systems are provided for estimating water storage in a charge air cooler (CAC). In one example, an amount of water accumulating in the CAC may be based on an output of an oxygen sensor positioned downstream of the CAC and ambient humidity. Further, engine actuators may be adjusted to purge condensate from the CAC and/or reduce condensate formation based on the amount of water inside the CAC.

20 Claims, 4 Drawing Sheets

(56) References Cited

OTHER PUBLICATIONS

Surnilla, Gopichandra et al., "Engine Control Coordination with Grille Shutter Adjustment and Ambient Conditions," U.S. Appl. No. 13/656,542, filed Oct. 19, 2012, 33 pages.

Styles, Daniel J. et al., "Engine Cooling Fan to Reduce Charge Air Cooler Corrosion," U.S. Appl. No. 13/656,471, filed Oct. 19, 2012, 44 pages.

Glugla, Chris P. et al., "Method for Purging Condensate From a Charge Air Cooler," U.S. Appl. No. 13/656,511, filed Oct. 19, 2012, 48 pages.

Glugla, Chris P. et al., "System and Method to Identify Ambient Conditions," U.S. Appl. No. 13/764,624, filed Nov. 8, 2012, 34 pages.

Surnilla, Gopichandra et al., "Exhaust Humidity Sensor," U.S. Appl. No. 13/706,194, filed Dec. 5, 2012, 34 pages.

Surnilla, Gopichandra et al., "Method for Estimating Charge Air Condensation Storage and/or Release With an Intake Oxygen Sensor," U.S. Appl. No. 13/967,968, filed Aug. 15, 2013, 57 pages.

Rollinger, John E. et al., "Method for Estimating Charge Air Cooler Condensation Storage and/or Release with Two Intake Oxygen Sensors," U.S. Appl. No. 13/967,943, filed Aug. 15, 2013, 58 pages.

\* cited by examiner

METHOD FOR ESTIMATING CHARGE AIR COOLER CONDENSATION STORAGE WITH AN INTAKE OXYGEN SENSOR

BACKGROUND/SUMMARY

Turbocharged and supercharged engines may be configured to compress ambient air entering the engine in order to increase power. Compression of the air may cause an increase in air temperature, thus, an intercooler or charge air cooler (CAC) may be utilized to cool the heated air thereby increasing its density and further increasing the potential power of the engine. Condensate may form in the CAC when the ambient air temperature decreases, or during humid or rainy weather conditions, where the intake air is cooled below the water dew point. Condensate may collect at the bottom of the CAC, or in the internal passages, and cooling turbulators. Under certain air flow conditions, condensate may exit the CAC and enter an intake manifold of the engine as water droplets. If too much condensate is ingested by the engine, engine misfire and/or combustion instability may occur.

Other attempts to address engine misfire due to condensate ingestion include avoiding condensate build-up. In one example, the cooling efficiency of the CAC may be decreased in order to reduce condensate formation. However, the inventors herein have recognized potential issues with such methods. Specifically, while some methods may reduce or slow condensate formation in the CAC, condensate may still build up over time. If this build-up cannot be stopped, ingestion of the condensate during acceleration may cause engine misfire. Additionally, in another example, engine actuators may be adjusted to increase combustion stability during condensate ingestion. In one example, the condensate ingestion may be based on a mass air flow rate and amount of condensate in the CAC; however, these parameters may not accurately reflect the amount of water in the charge air exiting the CAC and entering the intake manifold. As a result, engine misfire and/or unstable combustion may still occur.

In one example, the issues described above may be addressed by a method for adjusting engine actuators based on water storage at a charge air cooler (CAC), the water storage based on an output of an oxygen sensor positioned downstream of the CAC and ambient humidity. Specifically, the oxygen sensor may be positioned at an outlet of the CAC. An engine controller may use the output of the oxygen sensor to determine water storage at the CAC. In one example, water storage may include one or more of a water storage amount or a water storage rate (e.g., water accumulation rate within the CAC). The engine controller may then adjust engine operation to increase combustion stability, decrease condensate formation in the CAC, and/or evacuate condensate from the CAC in response to the determined water storage values. As a result, condensate formation within the CAC may be reduced and engine misfire and combustion instability due to water ingestion may be decreased.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
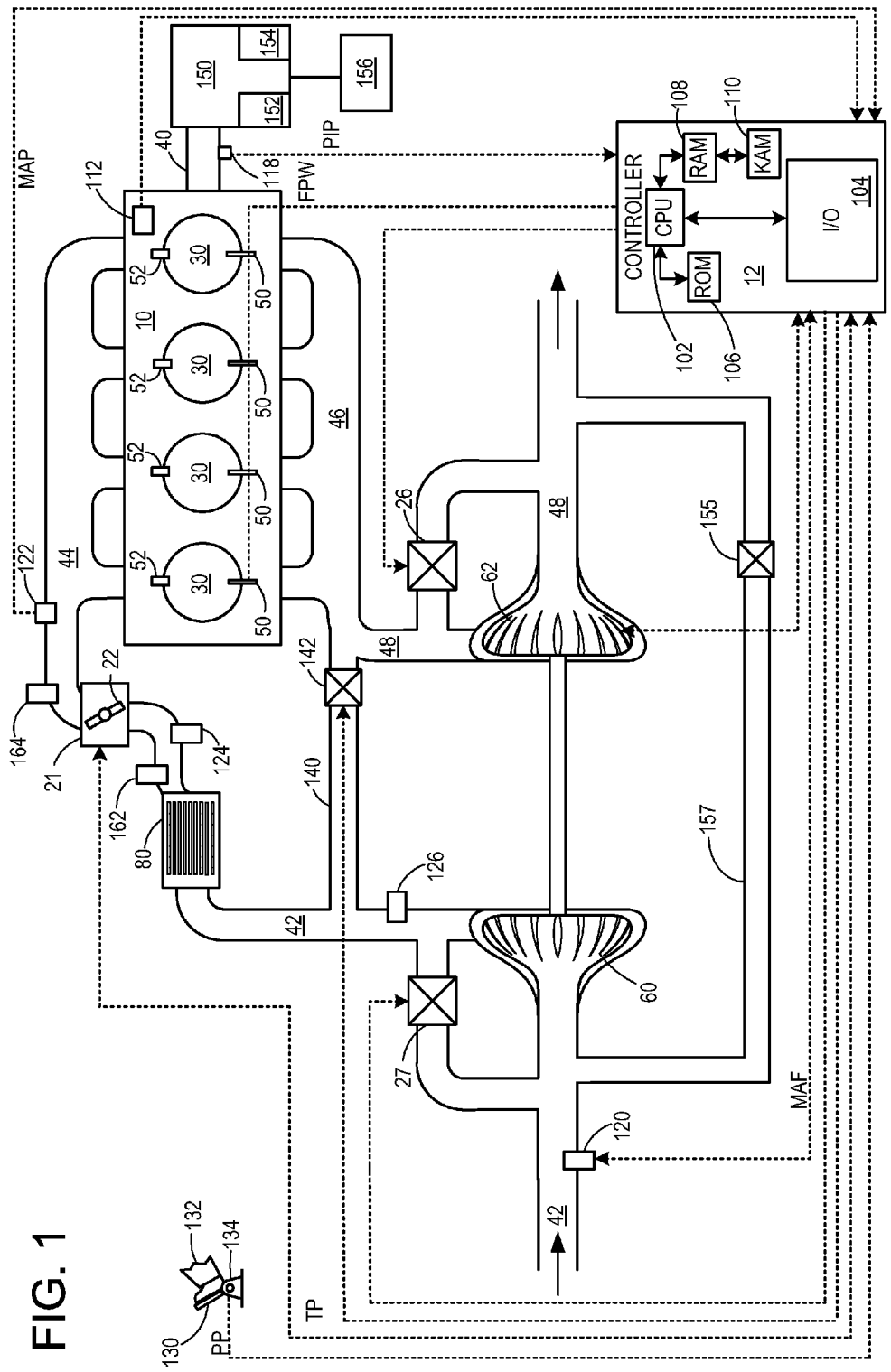
FIG. 1 is a schematic diagram of an example engine system including a charge air cooler.
Figure 2:
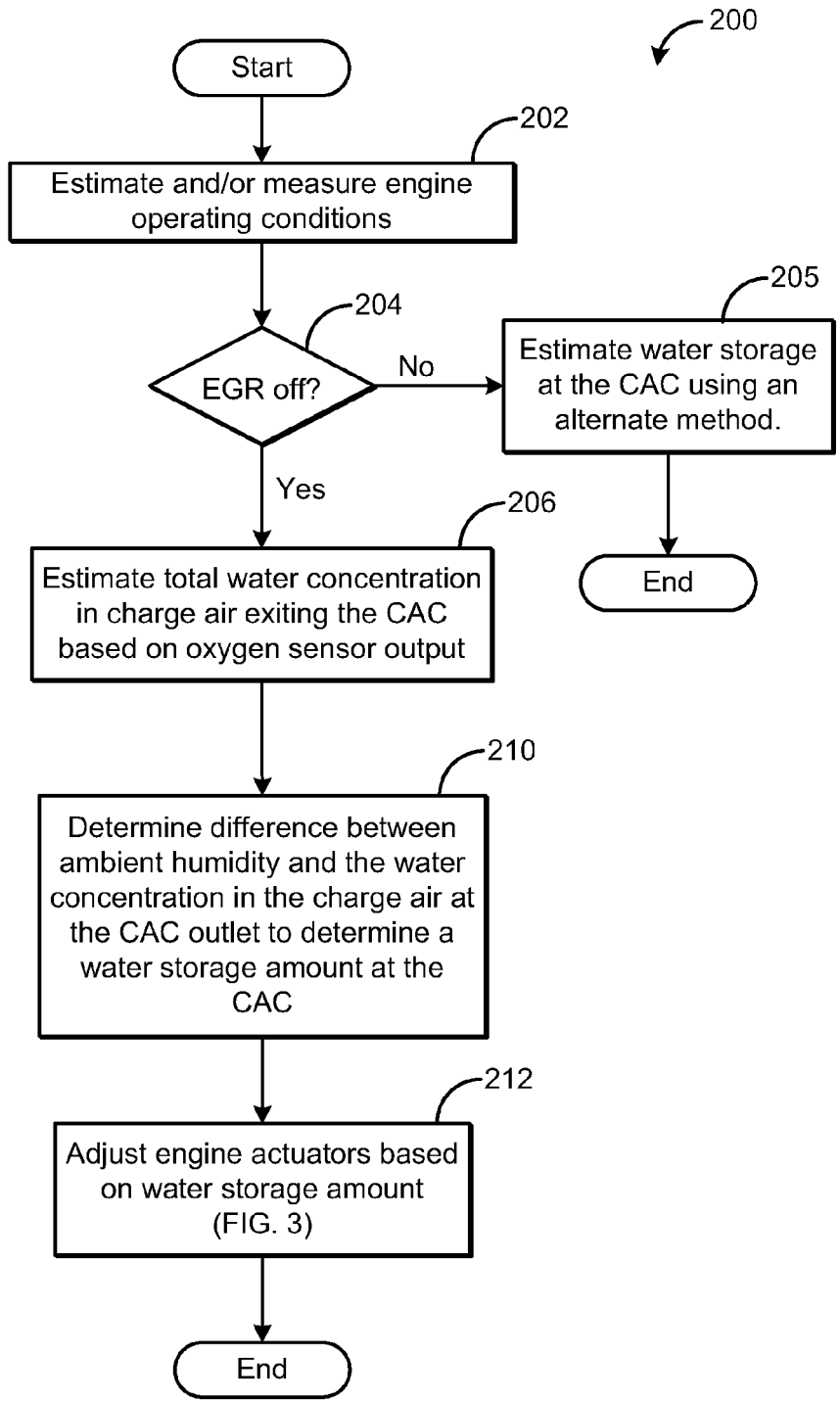
FIG. 2 is a flow chart of a method for operating an oxygen sensor to determine water storage at a charge air cooler.
Figure 3:
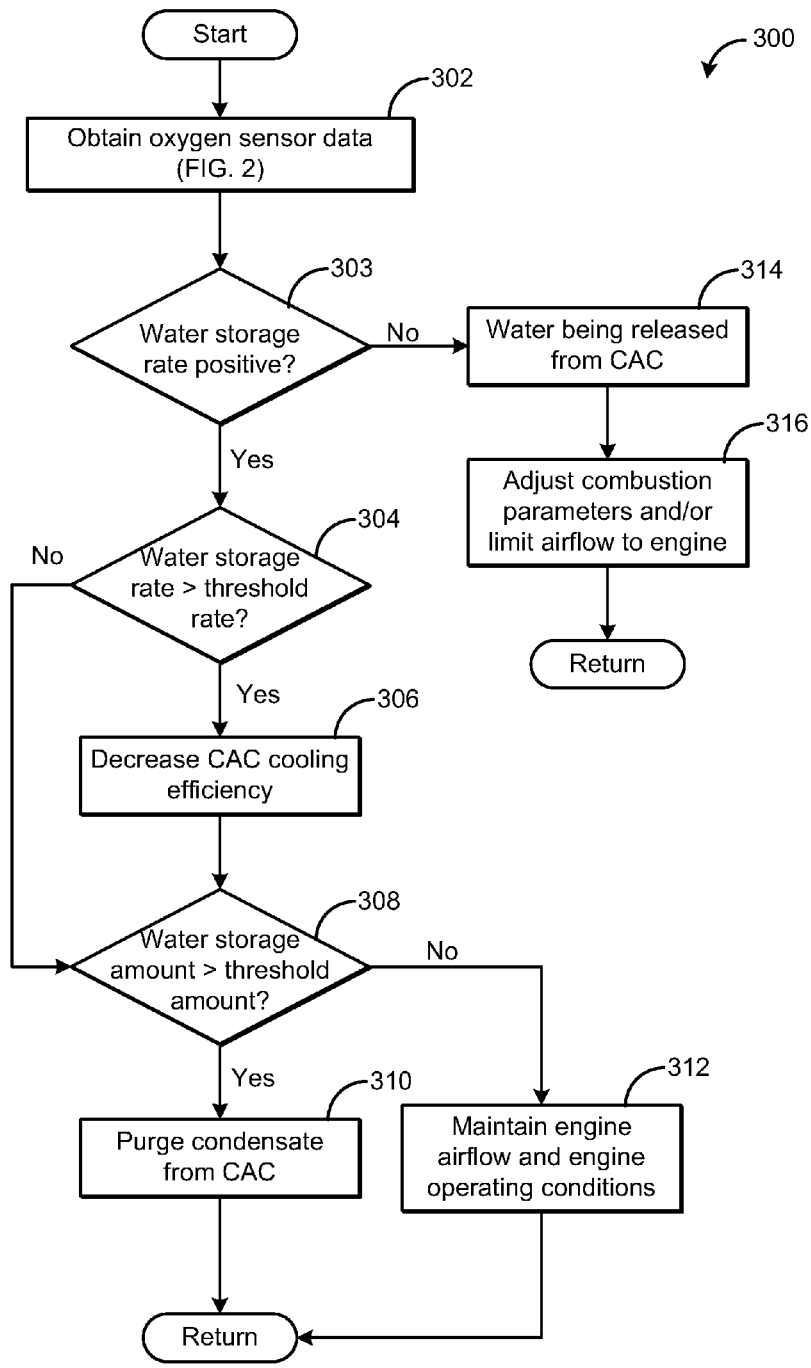
FIG. 3 is a flow chart of a method for adjusting engine operation based on water storage at a charge air cooler.

The following description relates to systems and methods for estimating water storage in a charge air cooler (CAC) in an engine system, such as the system of FIG. 1. A first oxygen sensor may be positioned at an outlet of the CAC. In one example, the oxygen sensor may be a variable voltage intake oxygen sensor which may operate between a variable voltage (VVs) mode and a base mode. A method for operating the first oxygen sensor to determine water storage at the CAC is shown in FIG. 2. Specifically, a water storage amount, or amount of water accumulated within the CAC, may be determined based on an output of the first oxygen sensor and ambient humidity. The first oxygen sensor may be different than a second intake oxygen sensor positioned within the intake manifold to determine EGR flow. An engine controller may adjust engine operation based on the water storage amount, as shown at FIG. 3. Adjusting engine operation may include adjusting engine actuators to decrease a cooling efficiency of the CAC, purge condensate from the CAC, and/or increase combustion stability during ingestion of water by the engine. FIGS. 4A-B show example engine actuator adjustments based on water storage at the CAC. In this way, positioning a first oxygen sensor at the outlet of the CAC may allow for the determination of condensate storage in the CAC. Engine actuator adjustments based on condensate storage may then decrease condensate formation in the CAC, increase combustion stability during condensate purging from the CAC, and/or decrease water storage within the CAC.

FIG. 1 is a schematic diagram showing an example engine 10, which may be included in a propulsion system of an automobile. The engine 10 is shown with four cylinders or combustion chambers 30. However, other numbers of cylinders may be used in accordance with the current disclosure. Engine 10 may be controlled at least partially by a control system including a controller 12, and by input from a vehicle operator 132 via an input device 130. In this example, the input device 130 includes an accelerator pedal and a pedal position sensor 134 for generating a proportional pedal position signal PP. Each combustion chamber (e.g., cylinder) 30 of the engine 10 may include combustion chamber walls with a piston (not shown) positioned therein. The pistons may be coupled to a crankshaft 40 so that reciprocating motion of the piston is translated into rotational motion of the crankshaft. The crankshaft 40 may be coupled to at least one drive wheel of a vehicle via an intermediate transmission system 150. Further, a starter motor may be coupled to crankshaft 40 via a flywheel to enable a starting operation of engine 10. The crankshaft 40 may also be used to drive an alternator (not shown in FIG. 1).

An engine output torque may be transmitted to a torque converter (not shown) to drive the automatic transmission system 150. Further, one or more clutches may be engaged, including forward clutch 154, to propel the automobile. In one example, the torque converter may be referred to as a component of the transmission system 150. Further, transmission system 150 may include a plurality of gear clutches 152 that may be engaged as needed to activate a plurality of fixed transmission gear ratios. Specifically, by adjusting the engagement of the plurality of gear clutches 152, the transmission may be shifted between a higher gear (that is, a gear with a lower gear ratio) and a lower gear (that is, a gear with a higher gear ratio). As such, the gear ratio difference enables a lower torque multiplication across the transmission when in the higher gear while enabling a higher torque multiplication across the transmission when in the lower gear. The vehicle may have four available gears, where transmission gear four (transmission fourth gear) is the highest available gear and transmission gear one (transmission first gear) is the lowest available gear. In other embodiments, the vehicle may have more or less than four available gears. As elaborated herein, a controller may vary the transmission gear (e.g., upshift or downshift the transmission gear) to adjust an amount of torque conveyed across the transmission and torque converter to vehicle wheels 156 (that is, an engine shaft output torque).

As the transmission shifts to a lower gear, the engine speed (Ne or RPM) increases, increasing engine airflow. An intake manifold vacuum generated by the spinning engine may be increased at the higher RPM. In some examples, as discussed further below, downshifting may be used to increase engine airflow and purge condensate built up in a charge air cooler (CAC) 80.

The combustion chambers 30 may receive intake air from the intake manifold 44 and may exhaust combustion gases via an exhaust manifold 46 to an exhaust passage 48. The intake manifold 44 and the exhaust manifold 46 can selectively communicate with the combustion chamber 30 via respective intake valves and exhaust valves (not shown). In some embodiments, the combustion chamber 30 may include two or more intake valves and/or two or more exhaust valves.

Fuel injectors 50 are shown coupled directly to the combustion chamber 30 for injecting fuel directly therein in proportion to the pulse width of signal FPW received from controller 12. In this manner, the fuel injector 50 provides what is known as direct injection of fuel into the combustion chamber 30; however it will be appreciated that port injection is also possible. Fuel may be delivered to the fuel injector 50 by a fuel system (not shown) including a fuel tank, a fuel pump, and a fuel rail.

In a process referred to as ignition, the injected fuel is ignited by known ignition means such as spark plug 52, resulting in combustion. Spark ignition timing may be controlled such that the spark occurs before (advanced) or after (retarded) the manufacturer's specified time. For example, spark timing may be retarded from maximum break torque (MBT) timing to control engine knock or advanced under high humidity conditions. In particular, MBT may be advanced to account for the slow burn rate. In one example, spark may be retarded during a tip-in. In an alternate embodiment, compression ignition may be used to ignite the injected fuel.

The intake manifold 44 may receive intake air from an intake passage 42. The intake passage 42 includes a throttle 21 having a throttle plate 22 to regulate flow to the intake manifold 44. In this particular example, the position (TP) of the throttle plate 22 may be varied by the controller 12 to enable electronic throttle control (ETC). In this manner, the throttle 21 may be operated to vary the intake air provided to the combustion chambers 30. For example, the controller 12 may adjust the throttle plate 22 to increase an opening of the throttle 21. Increasing the opening of the throttle 21 may increase the amount of air supplied to the intake manifold 44. In an alternate example, the opening of the throttle 21 may be decreased or closed completely to shut off airflow to the intake manifold 44. In some embodiments, additional throttles may be present in intake passage 42, such as a throttle upstream of a compressor 60 (not shown).

Further, in the disclosed embodiments, an exhaust gas recirculation (EGR) system may route a desired portion of exhaust gas from the exhaust passage 48 to the intake passage 42 via an EGR passage, such as high pressure EGR passage 140. The amount of EGR provided to the intake passage 42 may be varied by the controller 12 via an EGR valve, such as high pressure EGR valve 142. Under some conditions, the EGR system may be used to regulate the temperature of the air and fuel mixture within the combustion chamber. FIG. 1 shows a high pressure EGR system where EGR is routed from upstream of a turbine of a turbocharger to downstream of a compressor of a turbocharger through EGR passage 140. FIG. 1 also shows a low pressure EGR system where EGR is routed from downstream of turbine of a turbocharger to upstream of a compressor of a turbocharger through low pressure EGR passage 157. A low pressure EGR valve 155 may control the amount of EGR provided to the intake passage 42. In some embodiments, the engine may include both a high pressure EGR and a low pressure EGR system, as shown in FIG. 1. In other embodiments, the engine may include either a low pressure EGR system or a high pressure EGR system. When operable, the EGR system may induce the formation of condensate from the compressed air, particularly when the compressed air is cooled by the charge air cooler, as described in more detail below.

The engine 10 may further include a compression device such as a turbocharger or supercharger including at least a compressor 60 arranged along the intake passage 42. For a turbocharger, the compressor 60 may be at least partially driven by a turbine 62, via, for example a shaft, or other coupling arrangement. The turbine 62 may be arranged along the exhaust passage 48. Various arrangements may be provided to drive the compressor. For a supercharger, the compressor 60 may be at least partially driven by the engine and/or an electric machine, and may not include a turbine. Thus, the amount of compression provided to one or more cylinders of the engine via a turbocharger or supercharger may be varied by the controller 12.

In the embodiment shown in FIG. 1, the compressor 60 may be driven primarily by the turbine 62. The turbine 62 may be driven by exhaust gases flowing through the exhaust passage 48. Thus, the driving motion of the turbine 62 may drive the compressor 60. As such, the speed of the compressor 60 may be based on the speed of the turbine 62. As the speed of the compressor 60 increases, more boost may be provided through the intake passage 42 to the intake manifold 44.

Further, the exhaust passage 48 may include a wastegate 26 for diverting exhaust gas away from the turbine 62. Additionally, the intake passage 42 may include a compressor bypass or recirculation valve (CRV) 27 configured to divert intake air around the compressor 60. The wastegate 26 and/or the CRV 27 may be controlled by the controller 12 to be opened when a lower boost pressure is desired, for example. For example, in response to compressor surge or a potential compressor surge event, the controller 12 may open the CBV 27 to decrease pressure at the outlet of the compressor 60. This may reduce or stop compressor surge.

The intake passage 42 may further include a charge air cooler (CAC) 80 (e.g., an intercooler) to decrease the temperature of the turbocharged or supercharged intake gases. In some embodiments, the CAC 80 may be an air to air heat exchanger. In other embodiments, the CAC 80 may be an air to liquid heat exchanger. The CAC 80 may also be a variable volume CAC. Hot charge air (boosted air) from the compressor 60 enters the inlet of the CAC 80, cools as it travels through the CAC, and then exits to pass through the throttle 21 and then enter the engine intake manifold 44. Ambient air flow from outside the vehicle may enter engine 10 through a vehicle front end and pass across the CAC, to aid in cooling the charge air. Condensate may form and accumulate in the CAC when the ambient air temperature decreases, or during humid or rainy weather conditions, where the charge air is cooled below the water dew point temperature. Further, when the charge air entering the CAC is boosted (e.g., boost pressure and/or CAC pressure is greater than atmospheric pressure), condensate may form if the CAC temperature falls below the dew point temperature. When the charge air includes recirculated exhaust gasses, the condensate can become acidic and corrode the CAC housing. The corrosion can lead to leaks between the air charge, the atmosphere, and possibly the coolant in the case of water-to-air coolers. Further, if condensate builds up in the CAC, it may be ingested by the engine during times of increased airflow. As a result, unstable combustion and/or engine misfire may occur.

The engine 10 may further include one or more oxygen sensors positioned in the intake passage 42. As such, the one or more oxygen sensors may be referred to as intake oxygen sensors. In the depicted embodiment, a first oxygen sensor 162 is positioned downstream of the CAC 80. In one example, the first oxygen sensor 162 may be positioned at an outlet of the CAC 80. As such, the first oxygen sensor 162 may be referred to herein as the CAC outlet oxygen sensor. In another example, the first oxygen sensor 162 may be positioned downstream of the CAC 80 outlet. In some embodiments, as shown in FIG. 1, an optional second oxygen sensor 164 may be positioned in the intake manifold 44. As described further below, the second oxygen sensor 164 may be used to estimate EGR flow. In another embodiment, the second oxygen sensor 164 may be positioned in the intake passage 42 downstream of the compressor 60 and the EGR passage 140 (or EGR passage 157 if the engine only includes low pressure EGR). In yet other embodiments, a third oxygen sensor may be positioned at the inlet of the CAC.

Intake oxygen sensors 162 and/or 164 may be any suitable sensor for providing an indication of the oxygen concentration of the charge air (e.g., air flowing through the intake passage 42), such as a linear oxygen sensor, intake UEGO (universal or wide-range exhaust gas oxygen) sensor, two-state oxygen sensor, etc. In one example, the intake oxygen sensors 162 and/or 164 may be an intake oxygen sensor including a heated element as the measuring element. During operation, a pumping current of the intake oxygen sensor may be indicative of an amount of oxygen in the gas flow.

In another example, the intake oxygen sensor 162 and/or 164 may be a variable voltage (variable Vs or VVs) intake oxygen sensor wherein a reference voltage of the sensor may be modulated between a lower or base voltage at which oxygen is detected and a higher voltage at which water molecules in the gas flow may be dissociated. For example, during base operation, the intake oxygen sensor may operate at the base reference voltage. At the base reference voltage, when water hits the sensor, the heated element of the sensor may evaporate the water and measure it as a local vapor or diluent. This operational mode may be referred to herein as the base mode. The intake oxygen sensor may also operate in a second mode wherein the reference voltage is increased to a second reference voltage. The second reference voltage may be higher than the base reference voltage. Operating the intake oxygen sensor at the second reference voltage may be referred to herein as variable Vs (VVs) mode. When the intake oxygen sensor operates in VVs mode, the heated element of the sensor dissociates water in the air and subsequently measures the water concentration. In this mode, the pumping current of the sensor may be indicative of an amount of oxygen in the gas flow plus an amount of oxygen from dissociated water molecules. However, if the reference voltage is further increased, additional molecules, such as $CO_2$, may also be dissociated and the oxygen from these molecules may also be measured by the sensor. In a non-limiting example, the lower, base reference voltage may be 450 mV and the higher, second reference voltage may be greater than 950 mV. However, in the method presented at FIG. 2 for determining an amount of water in the charge air, the second reference voltage may be maintained lower than a voltage at which $CO_2$ may also be dissociated. In this way, the second reference voltage may be set such that only oxygen from water (and not $CO_2$) may be measured in VVs mode.

The first oxygen sensor 162 may be used to estimate condensate or water storage at the CAC 80. As discussed further below with reference to FIG. 2, the oxygen concentration in the air leaving the CAC 80 (e.g., determined by first oxygen sensor 162) may be used to determine a concentration of water within the CAC 80. Various methods may be used to estimate water in the CAC 80. For example, the intake oxygen sensor may measure an amount of oxygen in the charge air and then estimate an amount of water in the charge air using a dilution method. If the intake oxygen sensor is a VVs intake oxygen sensor, the sensor may estimate an amount of water in the charge air using a dissociation method (e.g., operating in VVs mode and modulating between a base reference voltage and a higher, second reference voltage). Both of these methods for measuring and/or estimating an amount of water in the charge air are discussed further below.

A first method for estimating water in the charge air using an intake oxygen sensor includes the dilution method. When using the dilution method, the intake oxygen sensor may be operated in the base mode at the base reference voltage. In one example, the base reference voltage may be 450 mV. In another example, the base reference voltage may be a voltage larger or smaller than 450 mV. The intake oxygen sensor may take a measurement and determine an amount of oxygen in the gas (e.g., intake or charge air) based on a pumping current of the sensor. Then, a comparison of the measured concentration of oxygen vs. the amount of air may be used to determine the amount of water as a diluent in the charge air. The dilution method may give an inaccurate water estimate if the diluent includes substances other than water, such as EGR and/or fuel vapor.

A second method for estimating water in the charge air using an intake oxygen sensor includes the dissociation method. Specifically, for the dissociation method, a VVs intake oxygen sensor may operate in VVs mode wherein the reference voltage is increased from the base reference voltage to the higher, second reference voltage. In one example, the second reference voltage may be 950 mV. In another example, the second reference voltage may be a voltage greater than 950 mV. However, the second reference voltage may be maintained at a voltage lower than the voltage at which $CO_2$ is dissociated by the sensor. In VVs mode, the intake oxygen sensor dissociates the water into hydrogen and oxygen and measures the amount of oxygen from dissociated water molecules in addition to the amount of oxygen in the gas. By taking the difference between the measurements at the second reference voltage and the base reference voltage, an estimate of the total water concentration in the charge air may be determined. Additionally, at each temperature condition at the outlet of the CAC, a different amount of saturated water may be produced. If the saturation water at the CAC outlet temperature condition is known (e.g., in a look-up table stored in the controller), the controller 12 may subtract this value from the total water concentration measured by the intake oxygen sensor to determine an amount water in the charge air in the form of water droplets. For example, the saturation water at the CAC outlet temperature condition may include a mass of water at the saturation vapor pressure condition at the CAC outlet. In this way, the controller may determine an amount of liquid water in the charge air exiting the CAC from intake oxygen sensor measurements.

Additionally, in both methods (e.g., dilution and dissociation) of estimating water in the charge air exiting the CAC, the oxygen concentration measurement from the intake oxygen sensor (IAO2) (e.g., sensor output of first oxygen sensor 162) may be adjusted based on additional diluents in the charge air such as purge vapors (e.g., from fuel canister purge events), positive crankcase ventilation flow (PCV), or the like. In some embodiments, correction factors for purge and/or PCV flow may be pre-determined for different engine operating conditions. The correction factors may then be used to adjust the output of the IAO2 before estimating the water concentration. As a result, any decrease in oxygen concentration from purge or PCV flow may be corrected for with the correction factor. This may result in a more accurate water estimate.

Additionally, by taking a difference between an estimate of water entering the CAC and water exiting the CAC (determined by the output of first oxygen sensor 162), the amount of water stored (e.g., accumulating) within the CAC may be determined. The amount of water entering the CAC may be approximated by ambient humidity. In one example, ambient humidity may be measured with an ambient humidity sensor. In another example, ambient humidity may be estimated based on intake temperature, intake pressure, and/or a windshield wiper duty cycle. In yet another example, ambient humidity may be determined based on information from local weather stations or using the IAO2 sensor reading when EGR is not flowing and no impact of PCV or purge exists (e.g., during no PCV or purge flow). For example, the ambient humidity is determined as specified only when low-pressure EGR in not flowing and/or during conditions without any low pressure EGR flow. In other examples the engine does not include low pressure EGR. Thus, a water accumulation rate in the CAC may be determined from the difference between ambient humidity and the water concentration of the CAC outlet air as determined from the output of the first oxygen sensor 162. Further, an amount of water within the CAC may be determined based on the water accumulation rate over a period of time. In some examples, estimating water inside the CAC in this way may only be performed when EGR is not flowing. Said another way, water estimates at the CAC based on ambient humidity and the output of the first oxygen sensor 162 may only be accurate when EGR is turned off or below a threshold rate, the threshold rate based on an EGR flow rate that may not significantly change the oxygen sensor output. As discussed further below, if EGR is flowing, alternate methods of estimating water accumulation in the CAC may be used.

The controller 12 may use measurements at the first oxygen sensor 162 and an ambient humidity value (estimated or measured) to determine a water storage rate and/or water storage amount in the CAC 80 (e.g., amount of water accumulated within the CAC 80). For example, an amount of water stored in the CAC 80 may be estimated from measurements from the first oxygen sensor 162 positioned at the CAC outlet. The controller 12 may determine the water storage amount by one or more of the methods described above (e.g., dilution or dissociation method). In another example, an amount of water released from the CAC may be determined from measurements from the first oxygen sensor 162.

In response to water storage estimates, the controller 12 may adjust engine actuators to adjust combustion parameters, activate condensate purging routines, and/or adjust actuators to increase or decrease CAC cooling efficiency. Engine actuator adjustments in response to water storage measurements from the oxygen sensors is presented in further detail below at FIG. 3.

The second oxygen sensor 164 may be used to determine EGR flow. For example, controller 12 may estimate the percent dilution of the EGR flow based on feedback from the second oxygen sensor 164. In some examples, the controller 12 may then adjust one or more of EGR valve 142, EGR valve 155, throttle 21, CRV 27, and/or wastegate 26 to achieve a desired EGR dilution percentage of the intake air. Thus, in this example, the first oxygen sensor 162 is different from the second oxygen sensor 164 used to estimate EGR flow. In other examples, EGR flow may be determined from the first oxygen sensor 162.

The controller 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. The controller 12 may receive various signals from sensors coupled to the engine 10 for performing various functions to operate the engine 10. In addition to those signals previously discussed, these signals may include measurement of inducted mass air flow from MAF sensor 120; engine coolant temperature (ECT) from temperature sensor 112, shown schematically in one location within the engine 10; a profile ignition pickup signal (PIP) from Hall effect sensor 118 (or other type) coupled to crankshaft 40; the throttle position (TP) from a throttle position sensor, as discussed; and absolute manifold pressure signal, MAP, from sensor 122, as discussed. Engine speed signal, RPM, may be generated by the controller 12 from signal PIP. Manifold pressure signal MAP from a manifold pressure sensor may be used to provide an indication of vacuum, or pressure, in the intake manifold 44. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, the Hall effect sensor 118, which is also used as an engine speed sensor, may produce a predetermined number of equally spaced pulses every revolution of the crankshaft 40.

Other sensors that may send signals to controller 12 include a temperature and/or pressure sensor 124 at an outlet of a charge air cooler 80, the first oxygen sensor 162, the second oxygen sensor 164, and a boost pressure sensor 126. Other sensors not depicted may also be present, such as a sensor for determining the intake air velocity at the inlet of the charge air cooler, and other sensors. In some examples, storage medium read-only memory chip 106 may be programmed with computer readable data representing instructions executable by microprocessor unit 102 for performing the methods described below as well as other variants that are anticipated but not specifically listed. Example routines are described herein at FIGS. 2-3.

The system of FIG. 1 provides for an engine system including an intake manifold, a charge air cooler positioned upstream of the intake manifold, an oxygen sensor positioned at an outlet of the charge air cooler, and a controller with computer readable instructions for adjusting engine operation responsive to water storage at the charge air cooler, the water storage based on an output of the oxygen sensor and ambient humidity when EGR is not flowing. In one example, adjusting engine operation includes one or more of adjusting spark timing, mass air flow, vehicle grille shutters, engine cooling fans, a charge air cooler coolant pump, and/or downshifting a transmission gear. Further, water storage includes one or more of a water storage amount in the charge air cooler or a water storage rate in the charge air cooler.

FIG. 2 shows a method 200 for operating an oxygen sensor to determine water storage at the CAC. Specifically, the oxygen sensor may be an oxygen sensor positioned proximate to an outlet of the CAC. In one example, the method 200 is executable by the controller 12 shown in FIG. 1. The method 200 may be used in an engine system in which an oxygen sensor at the outlet of the CAC (such as first oxygen sensor 162 shown in FIG. 1) and ambient humidity is used to determine water storage parameters at the CAC. In one example, the oxygen sensor is a VVs oxygen sensor capable of modulating between two reference voltages. In another example, the oxygen sensor may not be a VVs sensor and may estimate water storage at the CAC using a dilution method.

The method begins at 202 by estimating and/or measuring engine operating conditions. Engine operating conditions may include engine speed and load, EGR flow rate, mass air flow rate, conditions of the charge air cooler (e.g., inlet and/or outlet temperature and pressures), ambient humidity, ambient temperature, torque demand, etc. At 204, the method includes determining if EGR is turned off (e.g., EGR is not flowing). As discussed above, if EGR is flowing, the oxygen concentration determined by the oxygen sensor may decrease, thereby decreasing the accuracy of the water estimate. Thus, if EGR is not turned off, the method continues to 205 to estimate water storage at the CAC using an alternate method. Said another way, if EGR is flowing, water storage at the CAC may not be estimated using the oxygen sensor output and ambient humidity.

However, if EGR is turned off and not flowing, the method continues on to 206 to estimate the total water concentration in the charge air exiting the CAC based on the output of the oxygen sensor positioned at the CAC outlet (e.g., positioned downstream from the CAC). In one example, the water concentration in the charge air may be estimated from the oxygen sensor output using the dilution method. As discussed above, the dilution method may include measuring the amount of oxygen in the charge air exiting the CAC outlet. Assuming the diluent in the charge air is water, the controller may determine the amount of water in the charge air based on the concentration of oxygen in air vs. the concentration of oxygen measured in the charge air (with the oxygen sensor positioned at the CAC outlet). Since the oxygen sensor may be positioned at the CAC outlet, the amount of water in the charge air may be an estimate of the water release amount from the CAC.

In another example, the water concentration in the charge air may be estimated from the oxygen sensor output using the dissociation method (if the oxygen sensor is a VVs oxygen sensor). As discussed above, the dissociation method may include increasing the reference voltage of the oxygen sensor from a base, first voltage to a second voltage. The method may further include determining a change in pumping current between the base reference voltage and the second reference voltage. As described above, the change in pumping current may be indicative of the amount of oxygen in the gas and the amount of oxygen dissociated from water molecules in the gas (e.g., charge air). The total water (e.g., condensate) concentration in the charge air (e.g., in the charge air at the CAC outlet) may then be determined based on the change in pumping current. In some examples, an amount of liquid water (e.g., water droplets) in the charge air at the CAC outlet (e.g., exiting the CAC) may then be determined by subtracting a saturation water value for the CAC outlet temperature from the total water concentration. The saturation water values may include a mass of water at the saturation vapor pressure condition at the CAC outlet. As discussed above, the controller may determine the saturation water value from a look-up table of saturation water values at various CAC outlet temperatures stored in the controller.

At 210, the method includes determining a difference between ambient humidity and the total water concentration in the charge air at the CAC outlet in order to determine a water storage amount at (e.g., inside of) the CAC. As discussed above, the ambient humidity may be an estimated or measured value determined from one or more of a humidity sensor, weather data (received from a weather station, remote device, in-vehicle entertainment and communications system, etc.), intake temperature, intake pressure, and/or a windshield wiper duty cycle. The ambient humidity may give an estimate of water entering the CAC. Thus, a water accumulation rate (e.g., water storage rate) within the CAC may be substantially equal to the difference between the ambient humidity and water concentration at the CAC outlet (e.g., the water measurement from the oxygen sensor at the CAC outlet). Then, the method at 210 may also include determining the amount of water accumulated in the CAC based on the water storage rate over a period of time.

If the difference between the ambient humidity and the water concentration at the CAC outlet (determined at 208 and 210) is positive (e.g., ambient humidity greater than the water concentration at the CAC outlet), then water is being stored in the CAC. Alternatively, if the difference between the ambient humidity and the water concentration at the CAC outlet is negative (e.g., ambient humidity less than the water concentration at the CAC outlet), then water is being released from the CAC. In some examples, the method may also include estimating a water release amount and/or rate based on the output of the oxygen sensor at the CAC outlet and ambient humidity. In this way, a negative water storage rate may indicate a positive water release rate from the CAC. The water release rate may be further based on a saturation water value for the CAC outlet temperature from the total water concentration. The saturation water values may include a mass of water at the saturation vapor pressure condition at the CAC outlet. In one example, the controller may determine the saturation water value from a look-up table of saturation water values at various CAC outlet temperatures stored in the controller.

At 212, the controller may adjust engine actuators based on the water storage rate or amount determined at 210. In some examples, the controller may additionally or alternatively adjust engine actuators based on the water release rate and/or amount from the CAC. A method for adjusting engine actuators responsive to water storage is presented at FIG. 3.

In this way, a method may include adjusting engine operation responsive to water content in an intake system, the water content based on an output of an intake oxygen sensor wherein a reference voltage of the intake oxygen sensor is adjusted between a first voltage and a second voltage. As described above, an oxygen sensor may be positioned within an intake system (e.g., intake passage 42 and/or intake manifold 44 shown in FIG. 1). In one example, the intake oxygen sensor may be positioned at a CAC outlet. In another example, the intake oxygen sensor may be positioned at another location in the intake system such as downstream of the CAC. A reference voltage of the intake oxygen sensor may be adjusted, or modulated, between a first voltage and a second voltage, the second voltage being greater than the first voltage. The first voltage may be a voltage at which a concentration of oxygen in the intake air may be determined, for example, while the second voltage may be a voltage at which water molecules may be dissociated. A difference in a pumping current of the intake oxygen sensor at the first voltage and second voltage may be indicative of water content in the intake system. Engine operation, such as spark timing, airflow, etc., may then be adjusted response to the water content determined at the intake oxygen sensor.

Turning now to FIG. 3, a method 300 is shown for adjusting engine actuators and/or engine operation based on water storage in the CAC. In one example, the method 300 is executable by the controller 12 shown in FIG. 1. Method 300 begins at 302 by obtaining oxygen sensor data from one or more oxygen sensors. The one or more oxygen sensors may include an oxygen sensor positioned proximate to the outlet of the CAC (e.g., first oxygen sensor 162 shown in FIG. 1). For example, the method at 302 may include obtaining CAC water storage data or parameters determined in method 200, presented at FIG. 2. The water storage parameters may include one or more of a water storage rate (e.g., rate of water accumulating within the CAC) and/or a water storage amount (e.g., amount of water stored in the CAC). In some examples, the water storage parameters may further include a water release rate and/or amount.

At 303, the method includes determining if the water storage rate is positive. As described at FIG. 2, the water storage rate may be based on a difference between ambient humidity and the water concentration at the CAC outlet (based on oxygen sensor output). If ambient humidity is greater than the water concentration at the CAC outlet (e.g., water content at CAC inlet greater than water content at CAC outlet), then water is being stored in the CAC and the water storage rate is positive. Conversely, if the ambient humidity is less than the water concentration at the CAC outlet (e.g., water content at the CAC outlet greater than water content at the CAC inlet), then water is being released from the CAC and the water storage rate may be negative. Even though the water storage rate may be negative, the net amount of condensate within the CAC may still be greater than zero. In some examples wherein the ambient humidity is substantially equal to the water concentration at the CAC outlet, the water storage rate may be substantially zero such that no water is being released or stored within the CAC. The amount of water in the CAC may then be determined based on previous water storage rate data over a period of time.

If the water storage rate is negative at 303, the method continues on to 314 to indicate that water is being released from the CAC. In response to the negative water storage rate (e.g., ambient humidity being less than the water concentration of the charge air at the CAC outlet), the method continues on to 316 to adjust combustion parameters and/or limit airflow to the engine. In one example, adjusting combustion parameters may include adjusting spark timing to increase combustion stability during the water ingestion (e.g., water release from CAC). For example, the controller may advance spark timing during a tip-in (e.g., pedal position greater than an upper threshold position) when the water release rate and/or water release amount are greater than their respective thresholds. In another example, the controller may retard spark timing if the pedal position is relatively constant, or below a threshold position, when the water release rate and/or water release amount are greater than their respective thresholds (e.g., during a condensate purging routine). The amount of spark retard or advance may be based on the water release rate and/or the water release amount. In other examples, additional or alternative combustion parameters may be adjusted during the water release conditions.

Alternatively at 303, if the water storage rate is positive, the method continues on to 304 to determine if the water storage rate (e.g., condensate storage rate or water accumulation rate in the CAC) is greater than a threshold rate. In one example, the threshold water storage rate may be based on a rate at which a threshold amount of condensate may accumulate in the CAC. The threshold amount of condensate (or water) may result in engine misfire or unstable combustion if blown out of the CAC at once and ingested by the engine. If the water storage rate is greater than the threshold rate, the method continues on to 306 to decrease cooling efficiency of the CAC. Decreasing cooling efficiency of the CAC may include one or more of closing or reducing an opening of vehicle grille shutters, turning off or reducing a speed of an engine cooling fan and/or dedicated CAC fan, and/or decreasing coolant pump speed of a coolant-cooled CAC coolant pump. Other engine actuator adjustments may also be made to decrease the cooling efficiency of the CAC, thereby reducing condensate formation. In one example, the controller may adjust the above engine actuators (e.g., fan, grille shutters, etc.) to increase the CAC temperature above a dew point temperature. Alternately or additionally, the EGR rate may be reduced to reduce the condensate formation.

After decreasing CAC cooling efficiency, the method continues on to 308 to determine if a water storage amount at the CAC is greater than a threshold amount. As discussed above, the water storage amount may be an amount of condensate or water stored (e.g., built-up) within the CAC. In one example, the threshold water storage amount may be based on an amount of water that may result in engine misfire and/or unstable combustion if blown out of the CAC and ingested by the engine all at once. If the water storage amount at the CAC is greater than the threshold amount, the method continues on to 310 to purge accumulated condensate from the CAC. At 310, the controller may activate various condensate purging routines to evacuate condensate from the CAC, based on engine operating conditions. For example, during a tip-in or other increase in engine airflow, the controller may limit an increase in engine airflow to controllably release condensate from the CAC and into the intake manifold of the engine. In another example, the controller may increase engine airflow, even if there is not an increased torque request, to purge condensate from the CAC. In one example, the controller may increase engine airflow by downshifting at transmission gear. In another example, increasing engine airflow may include increasing an opening of a throttle to increase mass air flow. In yet another example, the purge routine may include activating a condensate pump and a method for disposing of the condensate. The method at 310 may also include adjusting additional engine actuators such as spark timing, air-fuel ratio, etc. during the various condensate purging routines. Alternatively, if the water storage amount is not greater than the threshold amount at 308, the method may continue on to 312 to maintain engine airflow at a requested level and maintain engine operating conditions.

In this way, the controller may adjust engine actuators to reduce condensate formation at the CAC and/or increase combustion stability during water release from the CAC. The controller may base the engine actuator adjustments on water storage and/or water release (e.g., amount of water in the charge air exiting the CAC) parameters. Further, the controller may determine the CAC water storage and/or water release parameters based on output from an oxygen sensor positioned downstream from the CAC outlet (e.g., at the outlet of the CAC).

In addition to controlling CAC cooling efficiency and/or combustion parameters, output from the outlet CAC oxygen sensor may be used for various diagnostics. In one example, the controller may use oxygen sensor output to diagnose alternate models and/or estimates of CAC efficiency, CAC condensate, and/or CAC dew point. For example, a water storage rate (or amount) determined from the outlet CAC oxygen sensor and ambient humidity may be compared to an expected water storage rate determined from one of the CAC condensate models. If the two water storage rate estimates are not within a threshold of one another, the controller may indicate an error in the condensate model. The controller may then make adjustments to the model to increase the accuracy.

In this way, an engine method comprises adjusting engine actuators based on water storage at a charge air cooler, the water storage based on an output of an oxygen sensor positioned downstream of the charge air cooler and ambient humidity. In one example, the oxygen sensor is positioned at an outlet of the charge air cooler. Additionally, the water storage may be one of a water storage rate within the charge air cooler or an amount of water stored within the charge air cooler.

In one example, adjusting engine actuators based on water storage includes adjusting one or more of vehicle grille shutters, engine cooling fans, or a charge air cooler coolant pump to decrease a cooling efficiency of the charge air cooler in response to the water storage rate increasing above a threshold rate. In another example, adjusting engine actuators based on water storage includes increasing engine airflow to purge condensate from the charge air cooler in response to the amount of water stored within the charge air cooler increasing above a threshold amount. In yet another example, adjusting engine actuators based on water storage includes adjusting one or more of spark timing or engine airflow in response to a water concentration at the charge air cooler outlet increasing above ambient humidity, the water concentration based on the output of the oxygen sensor.

In some embodiments, the oxygen sensor may be a variable voltage oxygen sensor. In this embodiment, a reference voltage of the oxygen sensor may be modulated between a first voltage and a second voltage, the second voltage higher than the first voltage. Water storage may be based on a difference in pumping current of the oxygen sensor between the first voltage and the second voltage and wherein the amount of water if further based on ambient humidity. In another example, the oxygen sensor may be operated in a base mode. Further, the water storage may be based on the output of the oxygen sensor only when EGR is not flowing (or below a threshold EGR rate).

In one example, ambient humidity is measured with a humidity sensor. In another example, ambient humidity is estimated based on one or more of intake temperature, intake pressure, or a windshield wiper duty cycle. In yet another example, ambient humidity may be determined based on weather data received from one or more of a weather station, remote device, or in-vehicle entertainment and communications system of the vehicle.

Figure 4:
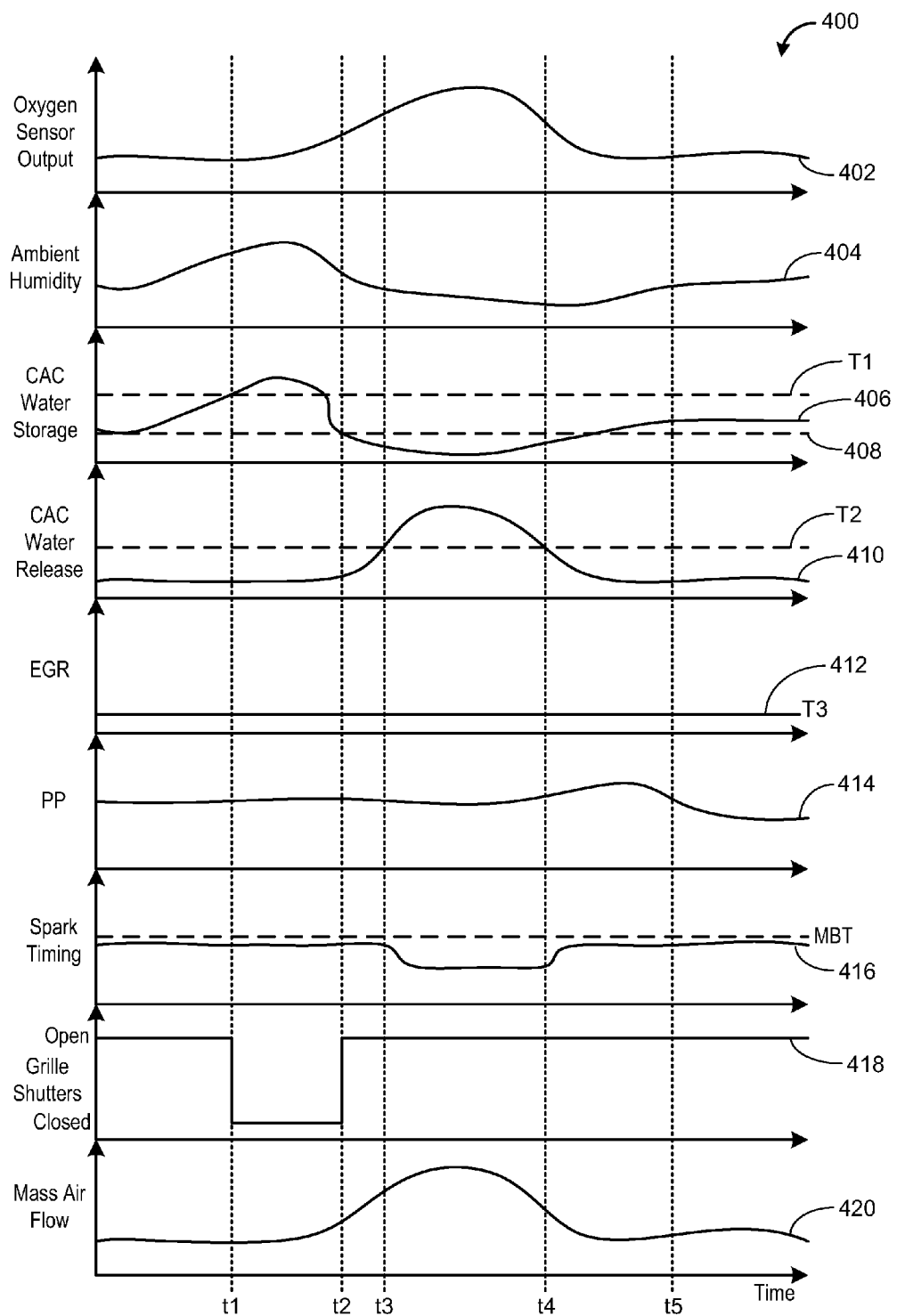
FIG. 4 show graphs illustrating example adjustments to engine operation based on water storage at a charge air cooler.

FIG. 4 shows a graphical example of adjustments to engine operation based on water storage at the CAC. Specifically, graph 400 shows changes in an output of an oxygen sensor at plot 402, changes in ambient humidity at plot 404, changes in CAC water storage based on the oxygen sensor output at plot 406, changes in CAC water release at plot 410, changes in EGR flow at plot 412, changes in pedal position (PP) at plot 414, changes in spark timing at plot 416, changes in a position of vehicle grille shutters at plot 418, and changes is mass air flow at plot 420. The oxygen sensor may be positioned at an outlet of the CAC and referred to herein as the outlet oxygen sensor. Ambient humidity may either be measured with a humidity sensor or estimated based on ambient conditions (e.g., temperature and pressure). As discussed above, in some examples an additional oxygen sensor (different from the outlet oxygen sensor) may be positioned in the intake (e.g., intake manifold) for estimating EGR flow. Additionally, if the outlet oxygen sensor is a VVs sensor, the outlet oxygen sensor may be modulated between a first reference voltage, V1, and a second reference voltage, V2. The first reference voltage may also be referred to as the base reference voltage. The water concentration at the outlet sensor may be based on the change in pumping current when switching between V1 and V2. In alternate embodiments, if the oxygen sensor is not a VVs sensor, the sensor may be maintained at a base reference voltage and the oxygen concentration at the CAC outlet may be determined using a dilution method.

Plot 406 shows changes in water storage in the CAC, the water storage based on the output from the outlet oxygen sensor and ambient humidity. The water storage shown at plot 406 may include an amount of water stored in the CAC or a rate of water storage in the CAC. Plot 410 shows water release from the CAC. The water release may be a water release amount or rate based off the water storage value (and thus based off the outlet oxygen sensor output and ambient humidity). At plot 406, substantially zero water storage is shown at the zero line 408. Below the zero line 408, the water storage value is negative, thereby corresponding to a positive water release value, as shown at plot 410.

Prior to time t1, water storage in the CAC may be less than a threshold T1 (plot 406) and water release from the CAC may be less than a threshold T2 (plot 410). Additionally, the pedal position may be relatively constant (plot 414) and the grille shutters may be open (plot 418). Before time t1, ambient humidity may be increasing. In one example, the ambient humidity may be an estimate of the amount of water in the charge air entering the CAC. Thus, increasing ambient humidity may indicate an increasing amount of water in the charge air entering the CAC. As a result, the CAC water storage level may be increasing before time t1 (plot 406). Also before time t1, the EGR rate may be below a threshold T3. In one example, the threshold T3 may be substantially zero such that the EGR is turned off. In another example, the threshold T3 may be a flow rate greater than zero but small enough that the EGR flow may not change the outlet oxygen sensor reading.

At time t1, the CAC water storage level increases above the threshold T1 (plot 406). In response, the controller may close the grille shutters (plot 418) to reduce condensate formation in the CAC. In alternate examples, the controller may adjust alternate or additional engine actuators to reduce condensate formation. For example, the controller may additionally or alternatively turn off an engine cooling fan at time t1.

Between time t1 and time t2 the CAC water storage level may decrease. At time t2, the CAC water storage may decrease below the threshold T1 and to a value of substantially zero (plot 406). In response, the controller may re-open the grille shutters (plot 418). In alternate embodiments, the grille shutters may remain open at time t2. Also before time t2, mass air flow begins to increase. In one example, the controller may increase mass air flow based on engine operation. In another example, the controller may increase mass air flow to purge the stored condensate from the CAC. As the mass air flow increases, the outlet oxygen sensor output also increases. This increase in output may indicate an increase in water in the charge air exiting the CAC. At time t2, the CAC water storage value becomes negative and CAC water release begins increasing between time t2 and time t3 (plot 410). At time t3, the CAC water release increases above threshold T2. In response, the controller retards spark timing from MBT (plot 416). The controller may retard spark timing rather than advancing spark timing since pedal position remains relatively constant at time t3. Retarding spark during the water release from the CAC may increase combustion stability as the engine ingests the released water (e.g., condensate). At time t4 the water release from the CAC decreases below the threshold T2 (plot 410). The controller then stops retarding spark (plot 416).

As shown in FIGS. 4A-B, an engine method includes adjusting engine actuators based on a water storage rate at a charge air cooler, the water storage rate based on an output of an oxygen sensor positioned at an outlet of the charge air cooler and ambient humidity. As shown at time t3, in one example, adjusting engine actuators includes adjusting one or more of spark timing or mass air flow in response to the water storage rate being negative. Further, adjusting spark timing includes advancing spark timing when a pedal position is increasing and retarding spark timing when the pedal position is below a threshold position.

In another example, as shown at time t1, adjusting engine actuators includes adjusting one or more of vehicle grilles shutters, engine cooling fans, charge air cooler cooling fans, or a charge air cooler coolant pump to decrease cooling efficiency of the charge air cooler in response to the water storage rate increasing above a threshold rate (e.g., threshold T1). The method may further include estimating a water storage amount based on the water storage rate. In yet another example, adjusting engine actuators includes increasing engine airflow to purge water from the charge air cooler in response to the water storage amount increasing above a threshold amount.

In this way, an output from an oxygen sensor positioned proximate to a CAC outlet may be used to determine water storage at the CAC. In one example, an oxygen sensor positioned at the outlet of the CAC may be used, along with ambient humidity, to determine an amount of water stored within the CAC. A controller may adjust one or more engine actuators in response to water storage at the CAC (e.g., amount of water or rate of water accumulation in the CAC). For example, the controller may adjust vehicle grille shutters, engine cooling fan, and/or an engine coolant pump to reduce CAC cooling efficiency in response to a water storage amount or rate above a threshold. In yet another example, the controller may adjust engine airflow via adjusting a throttle and/or downshifting operations to purge condensate from the CAC in response to the water storage amount increasing above a threshold. In this way, a technical result of determining water storage at the CAC from an oxygen sensor and ambient humidity may be achieved, thereby reducing CAC condensate formation and increasing combustion stability.

Note that the example control and estimation routines included herein can be used with various engine and/or vehicle system configurations. The control methods and routines disclosed herein may be stored as executable instructions in non-transitory memory. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An engine method, comprising:
using engine actuators to adjust engine operation based on water storage at a charge air cooler, the water storage determined based on an output of an oxygen sensor positioned downstream of the charge air cooler and ambient humidity.

2. The method of claim 1, wherein the oxygen sensor is positioned at an outlet of the charge air cooler.

3. The method of claim 1, wherein the water storage determination is based on the output of the oxygen sensor only when EGR is not flowing.

4. The method of claim 1, wherein ambient humidity is measured with a humidity sensor.

5. The method of claim 1, wherein ambient humidity is estimated based on one or more of intake temperature, intake pressure, or a windshield wiper duty cycle.

6. The method of claim 1, wherein ambient humidity is determined based on weather data received from one or more of a weather station, remote device, or in-vehicle entertainment and communications system.

7. The method of claim 1, wherein the oxygen sensor is a variable voltage oxygen sensor and further comprising modulating a reference voltage of the oxygen sensor between a first voltage and a second voltage, the second voltage higher than the first voltage.

8. The method of claim 7, wherein water storage determination is based on a difference in pumping current of the oxygen sensor between the first voltage and the second voltage and wherein the water storage determination is further based on ambient humidity.

9. The method of claim 1, wherein the water storage is one of a water storage rate within the charge air cooler or an amount of water stored within the charge air cooler.

10. The method of claim 9, wherein adjusting engine operation based on water storage includes adjusting one or more of vehicle grille shutters, engine cooling fans, or a charge air cooler coolant pump to decrease a cooling efficiency of the charge air cooler in response to the water storage rate increasing above a threshold rate.

11. The method of claim 9, wherein adjusting engine operation based on water storage includes increasing engine airflow to purge condensate from the charge air cooler in response to the amount of water stored within the charge air cooler increasing above a threshold amount.

12. The method of claim 9, wherein adjusting engine operation based on water storage includes adjusting one or more of spark timing or engine airflow in response to a water concentration at an outlet of the charge air cooler increasing above ambient humidity, the water concentration based on the output of the oxygen sensor.

13. An engine method, comprising:
using engine actuators to adjust engine operation based on a water storage rate at a charge air cooler, the water storage rate determined based on an output of an oxygen sensor positioned at an outlet of the charge air cooler and ambient humidity.

14. The method of claim 13, wherein adjusting engine operation includes adjusting one or more of vehicle grilles shutters, engine cooling fans, charge air cooler cooling fans, or a charge air cooler coolant pump to decrease cooling efficiency of the charge air cooler in response to the water storage rate increasing above a threshold rate.

15. The method of claim 13, further comprising estimating a water storage amount based on the water storage rate and wherein adjusting engine operation includes increasing engine airflow to purge water from the charge air cooler in response to the water storage amount increasing above a threshold amount.

16. The method of claim 13, wherein adjusting engine operation includes adjusting one or more of spark timing or mass air flow in response to the water storage rate being negative.

17. The method of claim 16, wherein adjusting spark timing includes advancing spark timing when a pedal position is increasing and retarding spark timing when the pedal position is below a threshold position.

18. An engine system, comprising:
an intake manifold;
a charge air cooler positioned upstream of the intake manifold;
an oxygen sensor positioned at an outlet of the charge air cooler; and
a controller with computer readable instructions for adjusting engine operation responsive to water storage at the charge air cooler, the water storage determined based on an output of the oxygen sensor and ambient humidity when exhaust gas recirculation is not flowing.

19. The system of claim 18, wherein adjusting engine operation includes one or more of adjusting spark timing, mass air flow, vehicle grille shutters, engine cooling fans, a charge air cooler coolant pump, or downshifting a transmission gear.

20. The system of claim 18, wherein water storage includes one or more of a water storage amount in the charge air cooler or a water storage rate in the charge air cooler.

* * * * *